United States Patent [19]

Perlman et al.

[11] Patent Number: 6,023,585

[45] Date of Patent: Feb. 8, 2000

[54] AUTOMATICALLY SELECTING AND DOWNLOADING DEVICE DRIVERS FROM A SERVER SYSTEM TO A CLIENT SYSTEM THAT INCLUDES ONE OR MORE DEVICES

[75] Inventors: Stephen G. Perlman, Mountain View; Tim Bucher, Los Altos, both of Calif.

[73] Assignee: WebTV Networks, Inc., Mountain View, Calif.

[21] Appl. No.: 08/850,846

[22] Filed: May 2, 1997

[51] Int. Cl.[7] .................................................. G06F 13/00
[52] U.S. Cl. ............................................................ 395/712
[58] Field of Search ................................... 395/681, 680, 395/712, 652, 685, 828, 653, 830

[56] References Cited

U.S. PATENT DOCUMENTS

| | | | |
|---|---|---|---|
| 5,325,423 | 6/1994 | Lewis | 379/90 |
| 5,488,411 | 1/1996 | Lewis | 348/8 |
| 5,538,255 | 7/1996 | Barker | 463/41 |
| 5,558,339 | 9/1996 | Perlman | 463/42 |
| 5,564,001 | 10/1996 | Lewis | 395/154 |
| 5,580,177 | 12/1996 | Gase et al. | 400/61 |
| 5,586,257 | 12/1996 | Perlman | 463/42 |
| 5,612,730 | 3/1997 | Lewis | 348/8 |
| 5,655,148 | 8/1997 | Richman et al. | 395/828 |
| 5,748,980 | 5/1998 | Lipe et al. | 395/828 |
| 5,802,297 | 9/1998 | Engquist | 395/200.42 |
| 5,809,329 | 9/1998 | Lichtman et al. | 395/828 |

*Primary Examiner*—Tod R. Swann
*Assistant Examiner*—Matthew Smithers
*Attorney, Agent, or Firm*—Workman, Nydegger, Seeley

[57] ABSTRACT

A method is provided of installing device drivers in a host processing system coupled to a number of peripheral devices. At system initialization, the host processing system requests the peripheral devices to which it is coupled to each provide a device code for identifying the type of the peripheral device. The host processing system receives the device codes from the peripheral devices and transmits the device codes to a remote server over a network, such as the Internet. The remote server selects an appropriate device driver for each peripheral device from a plurality of stored device drivers based on the device codes received from the host processing system and then transmits the device drivers to the host processing system over the network. This driver download process is carried out with no intervention from the user.

32 Claims, 6 Drawing Sheets

AUTOMATICALLY SELECTING AND DOWNLOADING DEVICE DRIVERS FROM A SERVER SYSTEM TO A CLIENT SYSTEM THAT INCLUDES ONE OR MORE DEVICES

FIELD OF THE INVENTION

The present invention pertains to the field of computer systems. More particularly, the present invention relates to a technique for installing device drivers for computer system peripheral devices.

BACKGROUND OF THE INVENTION

Modern personal computer systems are often characterized by a main computer, or host device, to which one or more peripheral devices may be coupled. Typical peripheral devices that may be used in such a system include keyboards, pointing devices, monitors, printers, mass storage devices, and audio or visual input/output devices. Generally, for any particular peripheral device, the main computer must be programmed with special software that permits the main computer to communicate with the peripheral device—this software is often referred to as the device driver for the peripheral device.

Many computer systems rely upon the user to manually load the appropriate device drivers whenever a new peripheral device is connected to the main processing system. This approach places an undesirable burden upon the user. In other cases, a computer system might be sold to the user with a number of device drivers already installed. Some of those drivers may simply reside in memory without being used if the corresponding peripheral devices are not purchased or are simply not connected by the user, thus wasting valuable memory space. This approach becomes especially undesirable as the number of different peripheral devices which could potentially be used with the computer system increases. A third approach which avoids this type of waste is to pre-load the appropriate driver into a non-volatile memory within the peripheral device; the main computer could then load the appropriate driver from the peripheral device when the peripheral device is connected to the system. This approach has the disadvantage, however, of requiring additional memory space to be provided in the peripheral device, which adds to the cost of the device.

Therefore, it is desirable to provide a technique by which the appropriate drivers for all peripheral devices connected to a computer system are automatically installed in the computer system. It is further desirable that only those device drivers for peripheral devices that are actually connected are so installed, so as to avoid unnecessary consumption of memory in the computer system. It is further desirable that such a technique avoid storing device drivers on individual peripheral devices.

SUMMARY OF THE INVENTION

The present invention includes a method of installing a device driver in a host processing device coupled to a peripheral device. In the method, a device code is received from the peripheral device. The device code is then transmitted to a remote processing system. An appropriate device driver is then received from the remote processing system in response to the transmission of the device code to the remote processing system.

In another aspect of the present invention, the remote processing system receives the device code from the host processing device and uses the device code to select an appropriate device driver for the peripheral device from a number of stored device drivers. In particular embodiments, communication between the host processing device and the remote processing system is implemented over a network, such as the Internet.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described for automatically installing appropriate device drivers for all peripheral devices connected to a host processing system over a network. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention includes steps which, in one embodiment, are embodied in machine-executable software instructions, such that the present invention is carried out in a processing system as a result of a processor executing the instructions. In other embodiments, hardwired circuitry may be used in place of, or in combination with, software instructions to implement the present invention.

In one embodiment, the present invention is included in a system known as WebTV™ (hereinafter "WebTV"), which uses a standard television set as a display device for browsing the World Wide Web ("the Web") and which connects to the Internet using a standard telephone, ISDN (Integrated Services Digital Network), or other similar communication path. A user of a WebTV client system can access, via the Internet (generally), WebTV Network services provided by one or more remote WebTV servers. The WebTV Network services are used in conjunction with software running in a WebTV client system to enable the user to browse the Web, send electronic mail, and to make use of the Internet in various other ways.

Although the present invention is described herein as implemented in the WebTV system for illustrative purposes, the present invention can also be implemented in other contexts, such as in a conventional personal computer (PC), workstation, etc.

I. System Overview

Figure 1:
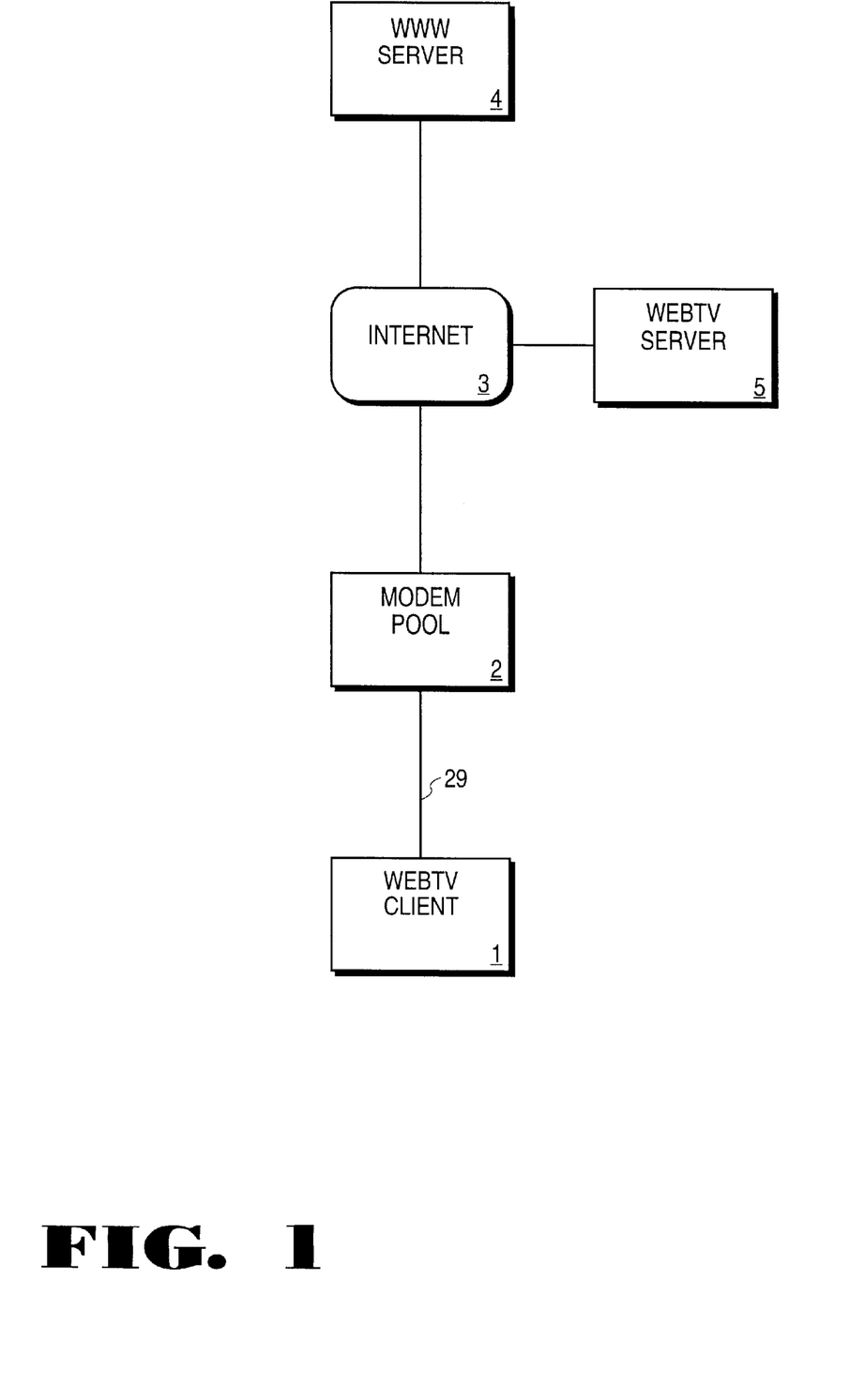
FIG. 1 illustrates a WebTV client system connected to a WebTV server system over the Internet.

FIG. 1 illustrates a configuration of a WebTV network according to one embodiment. A WebTV client 1 is coupled to a modem pool 2 via a direct-dial, bidirectional data connection 29, which may be a conventional telephone, i.e., "plain old telephone service" (POTS) or ISDN link, or any other suitable type of data connection. The modem pool 2 may be provided by a local Internet Service Provider (ISP). The modem pool 2 is coupled typically through a router, such as that conventionally known in the art, to at least one remote Web server (hereinafter WWW server) 4 via a conventional network infrastructure 3, such as the Internet. The WebTV system also includes a WebTV server 5, which implements WebTV Network services and specifically supports the WebTV client 1. The WebTV server 5 generally includes one or more conventional computer systems. The server 5 may actually comprise multiple physical and logical devices connected in a distributed architecture. The client 1 can connect to the server 5 either through direct data connection (i.e., telephone, ISDN, etc.) or through the Internet 3 via the modem pool 2. Note that the modem pool 2 is a conventional modem pool, such as those found today providing access throughout the world to the Internet and private networks.

A. WebTV Client System

Figure 2:
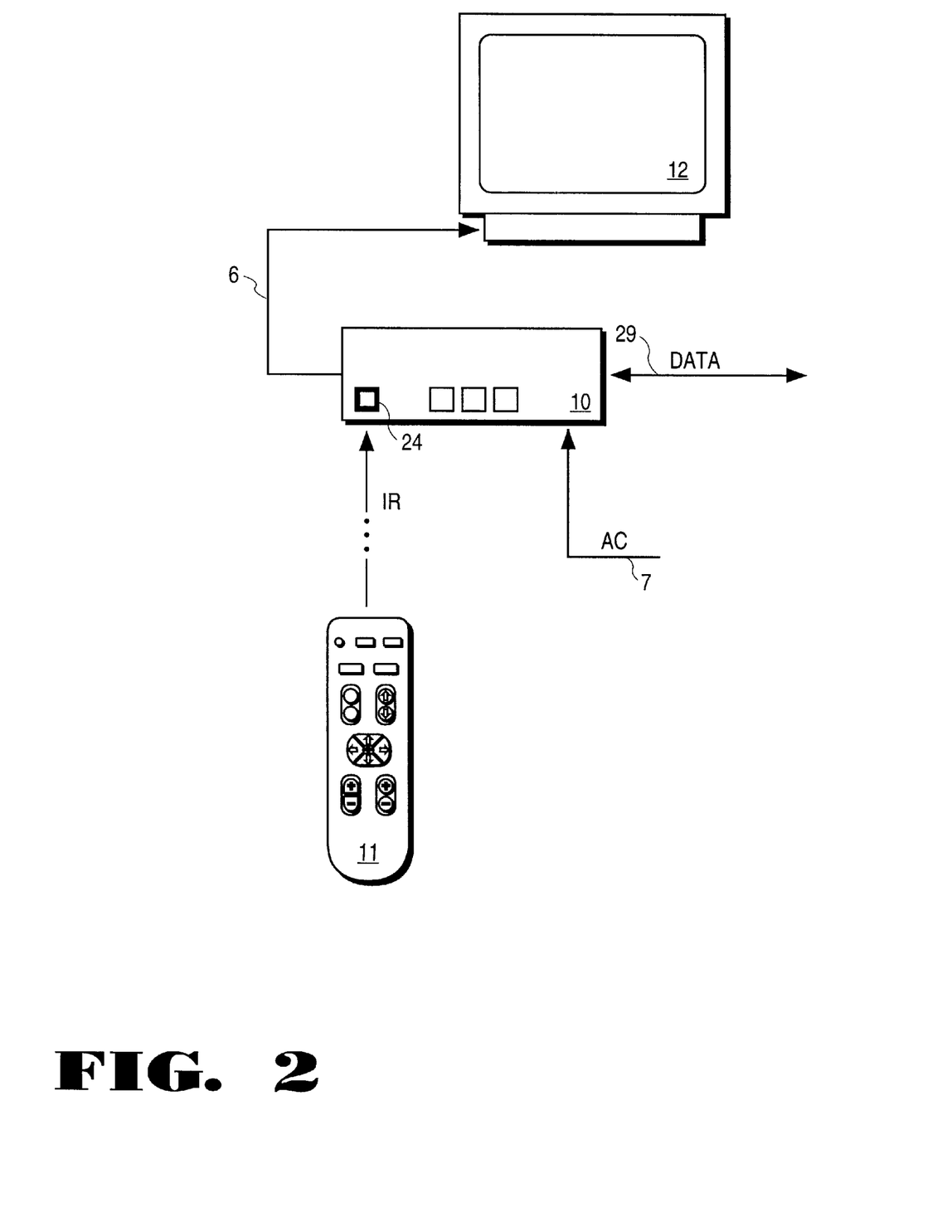
FIG. 2 illustrates a WebTV client system.

FIG. 2 illustrates a WebTV client system 1 according to one embodiment. The client system 1 includes an electronics unit 10 (hereinafter "the WebTV box 10" or "the box 10"), an ordinary television set 12, and a hand-held remote control 11. In an alternative embodiment (not shown), the WebTV box 10 is built into the television set 12 as an integral unit. The box 10 includes hardware and software for providing the user with a graphical user interface by which the user can browse the Web, send e-mail, and access other Internet services. The client system 1 uses the television set 12 as both a display device and an audio output device. The box 10 is coupled to the television set 12 by a link 6. The link 6 includes an audio channel for generating sound from the television's speaker and an RF (radio frequency), S-video, composite video, or other equivalent form of video channel. The data link 29 between the box 10 and the WebTV server 5 can be a conventional telephone (POTS, i.e., Plain Old Telephone Service), ISDN, or other suitable data connection. The box 10 receives alternating-current (AC) power through a conventional AC power line 7. Remote control 11 is operated by the user in order to control the client system 1 to browse the Web and perform other functions. The box 10 receives commands from remote control 11 via an infrared (IR) communication Link. In alternative embodiments, the link between the remote control 11 and the box 10 may be an RF link or any other suitable type of link.

Figure 3:
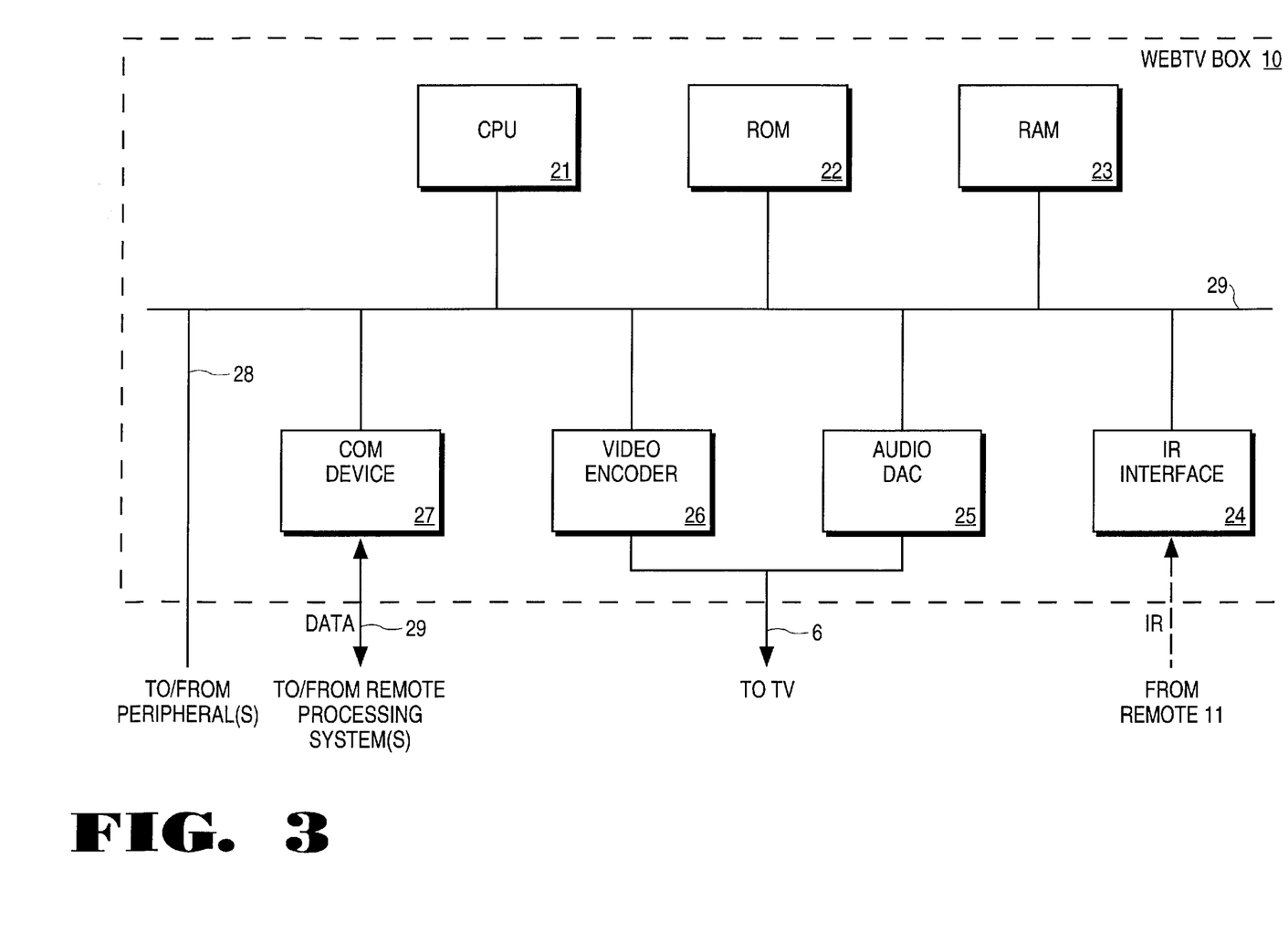
FIG. 3 illustrates the internal features of a WebTV box in block diagram form.

FIG. 3 illustrates the internal components of the WebTV box 10, according to one embodiment. Operation of the client system 1 is controlled by a central processing unit (CPU) 21, which is coupled to a bus 29. It will be recognized that functions described herein as being performed by the WebTV box 10 may result from the CPU 21 of the WebTV box 10 executing software instructions, from operation of hardwired circuitry, or both. It will also be recognized that bus 29 may represent multiple physical buses connected by various bridges and/or adapters, the details of which are not required for an understanding of the present invention.

Also coupled to the bus 29 are an audio digital-to-analog converter (DAC) 25, which provides audio output to the television 12, and a video encoder 26, which provides video output to the television set 12. The outputs of the audio DAC 25 and the video encoder 26 are combined by conventional circuitry (not shown) to produce the link 6 to the television 12. An IR interface 24 coupled to the bus 29 detects IR signals transmitted by remote control 11 and, in response, provides corresponding electrical signals onto the bus 29. A communication device 27 is coupled to the bus 29 to provide bidirectional data communication with the remote WebTV server 5 and WWW servers 4. The communication device 27 may be a conventional telephone modem, an ISDN adapter, or any other suitable data communication device. A read-only memory (ROM) 22 and a random access memory (RAM) 23 are also coupled to the bus 29. The ROM 22 may include programmable-erasable memory, such as electrically-erasable programmable ROM (EEPROM) or flash memory.

Also coupled to the bus 29 is an expansion bus 28. The expansion bus 28 is a high-speed, multiplexed (address and data), parallel bus that is used to connect various peripheral devices to the WebTV box 10; the WebTV box 10 thereby functions as the host device of a processing system. Peripheral devices which may be connected to the WebTV box 10 using expansion bus 28 include devices such as printers, mass storage devices (e.g., CD-ROM, digital versatile disk (DVD), magnetic disk, etc.), microphones, video cameras, video tuners, and additional data communication devices. It will be recognized that various adapters may be used to interface the expansion bus 28 with bus 29, the details of which are not required for an understanding of the present invention.

B. WebTV Server System

Certain steps of the present invention may be performed by the server 5. As in the case of the client 1, such steps generally may be implemented using software, hardwired circuitry, or a combination thereof. The WebTV server 5 generally includes one or more computer systems having the architecture illustrated in FIG. 4. Note, however, that the illustrated architecture is only one possible architecture; a WebTV server 5 is not restricted to such an architecture for purposes of practicing the present invention. The illustrated architecture includes a CPU 50, ROM 51, RAM 52, a mass storage facility 53, a communication device 55, and various input/output (I/O) devices 56. It will be recognized that functions described herein as being performed by the WebTV server 5 may result from the CPU 50 of the WebTV server 5 executing software instructions, from operation of hardwired circuitry, or both.

Figure 4:
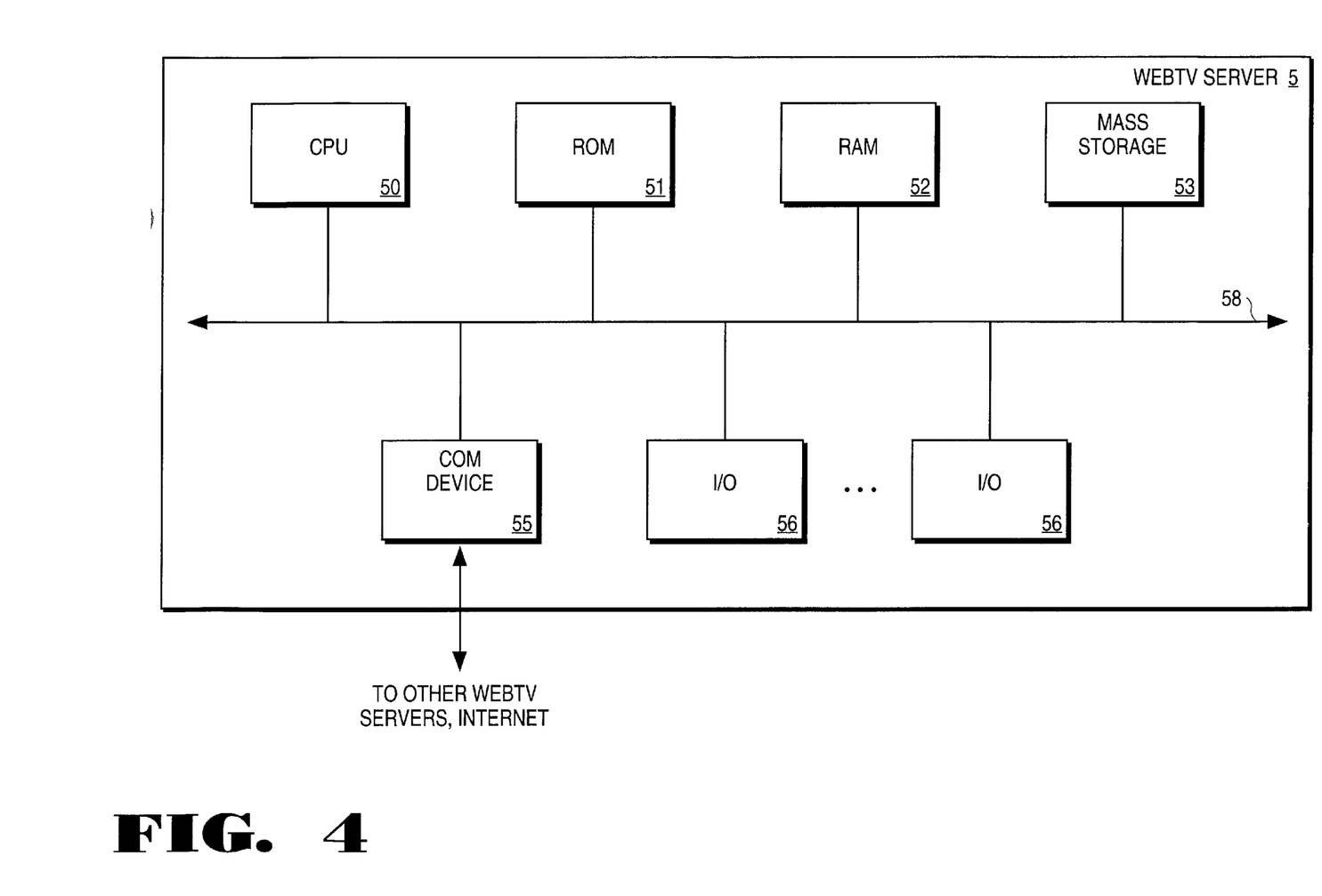
FIG. 4 illustrates the internal features of a WebTV server in block diagram form.

ROM 51 may include programmable and/or programmable-erasable storage. Mass storage facility 53 may include a magnetic, optical, magneto-optical, or other equivalent mass storage medium. It should be noted that the WebTV server system 5 includes substantially more data storage capacity than the WebTV client system 1. I/O devices 56 may include a monitor, a keyboard, a pointing device, and other similar devices, for example. Communication device 55 may be a conventional telephone (POTS) modem, an ISDN adapter, or any other suitable data communication device. Communication device 55 may be used to communicate data between the server 5 and the remote WWW server 4.

Note that the WebTV server 5 may actually comprise multiple devices connected in a distributed architecture; accordingly, communication device 55 may be used to communicate data between the server 5 and other physical devices used to implement WebTV server functions. The WebTV server 5 may also include a network interface card (NIC) or other similar device for communicating with other physical devices that provide WebTV server functions.

II. Connection of Peripheral Devices

Figure 5:
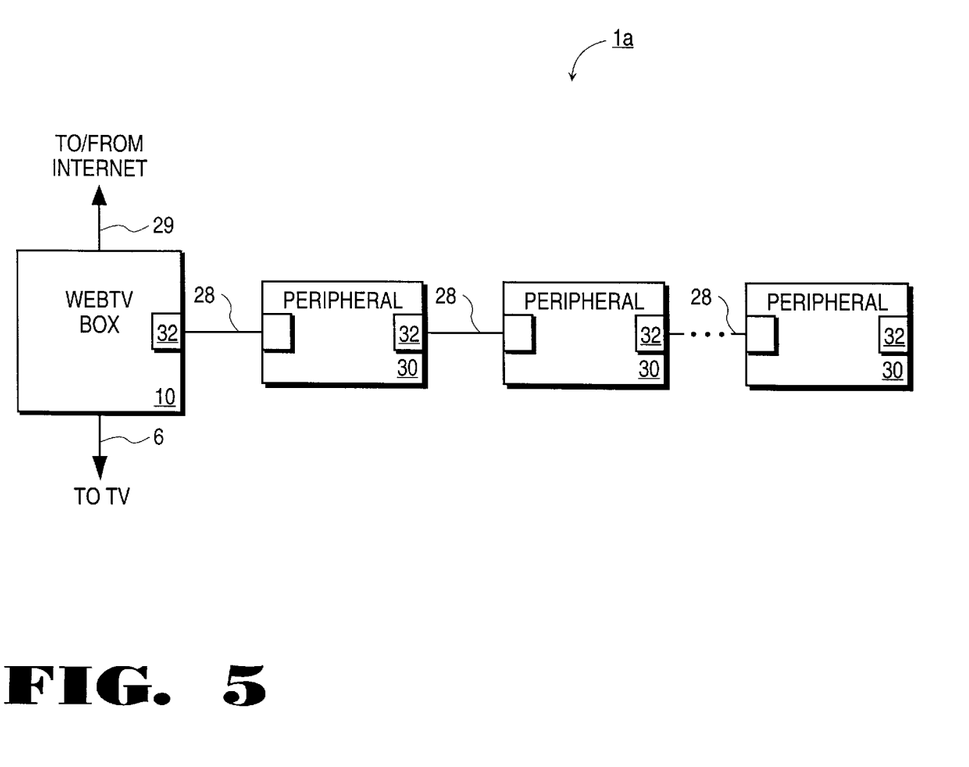
FIG. 5 illustrates a WebTV box connected to a number of peripheral devices in a daisy chain.

FIG. 5 illustrates a WebTV client system 1a according to an embodiment of the present invention in which the WebTV box 10 is connected to a number of peripheral devices 30 on the expansion bus 28 in a daisy chain configuration. The peripheral devices 30 may include keyboards, pointing devices, monitors, printers, mass storage devices, and audio or visual input/output devices, for example. It is useful at this point to define certain terminology to be used in this description relating to the topological position (i.e., slot position) of devices connected in the daisy chain. For purposes of this description, the phrase "more senior in the daisy chain" refers to devices that are topologically closer to the WebTV box 10 in the daisy chain than a given device, while the phrase "more junior in the daisy chain" refers to devices that are topologically farther from the WebTV box 10 in the daisy chain than a given device. Thus, the greater the number of devices that are connected in the daisy chain between a given device and the WebTV box 10, the "more junior" in the daisy chain the given device is considered to be; the fewer the number of devices that are connected in the daisy chain between a given device and the WebTV box 10, the "more senior" in the daisy chain the given device is considered to be.

A. Topology Determination

At system initialization (i.e., upon power-up or in response to a reset command), the WebTV box 10 determines the topological configuration of the processing system. That is, the WebTV box 10 initiates the process of assigning a slot position to each peripheral device and determines the number of peripheral devices on the expansion bus 28. Generally, in this process, each peripheral device 30 in the daisy chain receives the slot number of the next more senior device in the daisy chain and assigns itself that slot number incremented by one. This action occurs by the WebTV box 10 initially assigning itself a slot number of zero and then transmitting that slot number onto the bus 28 to the most senior peripheral device 30 in the daisy chain. The most senior peripheral device 30 in the daisy chain receives slot number zero from the WebTV box 10 and accordingly assigns itself a slot number of one. That peripheral device then passes its slot number on to the next most senior device in the daisy chain, and this process repeats for each peripheral device 30 until all peripheral devices 30 have been assigned a unique slot number. In response to a query from the WebTV box 10, each peripheral device 30 then transmits its slot number onto the bus 28 back to the WebTV box 10. Based on the responses to the queries, the WebTV box 10 determines the number of devices on the bus 28 and the slot positions of the devices.

B. Installation of Device Drivers

For each of the peripheral devices 30 in the daisy chain, an appropriate device driver must be stored somewhere within the processing system. However, as mentioned above, it is not desirable to store such drivers within the peripheral devices themselves, nor is it desirable to pre-load into the WebTV box 10 a device driver for every possible peripheral device which might be connected to the expansion bus 28. Further, it is not desirable to require a user of the client system 1a to manually load the appropriate device drivers. Consequently, the present invention includes a technique for automatically installing in the WebTV client system 1a only the appropriate device drivers for the particular system configuration being used, as will now be described.

Each peripheral device that is designed for use with a WebTV client system is provided with a device code that is used to precisely identify the peripheral device. For example, this code may identify the type of device (e.g., printer), the manufacturer, and the model number. In one embodiment, the device code is a 64-bit code stored within a register in the peripheral device. In accordance with the present invention, these device codes are used by the WebTV box 10 to request and receive only the appropriate drivers for the peripheral devices 30 that are actually connected in the system 1a, as will now be described with reference to FIG. 6.

Figure 6:
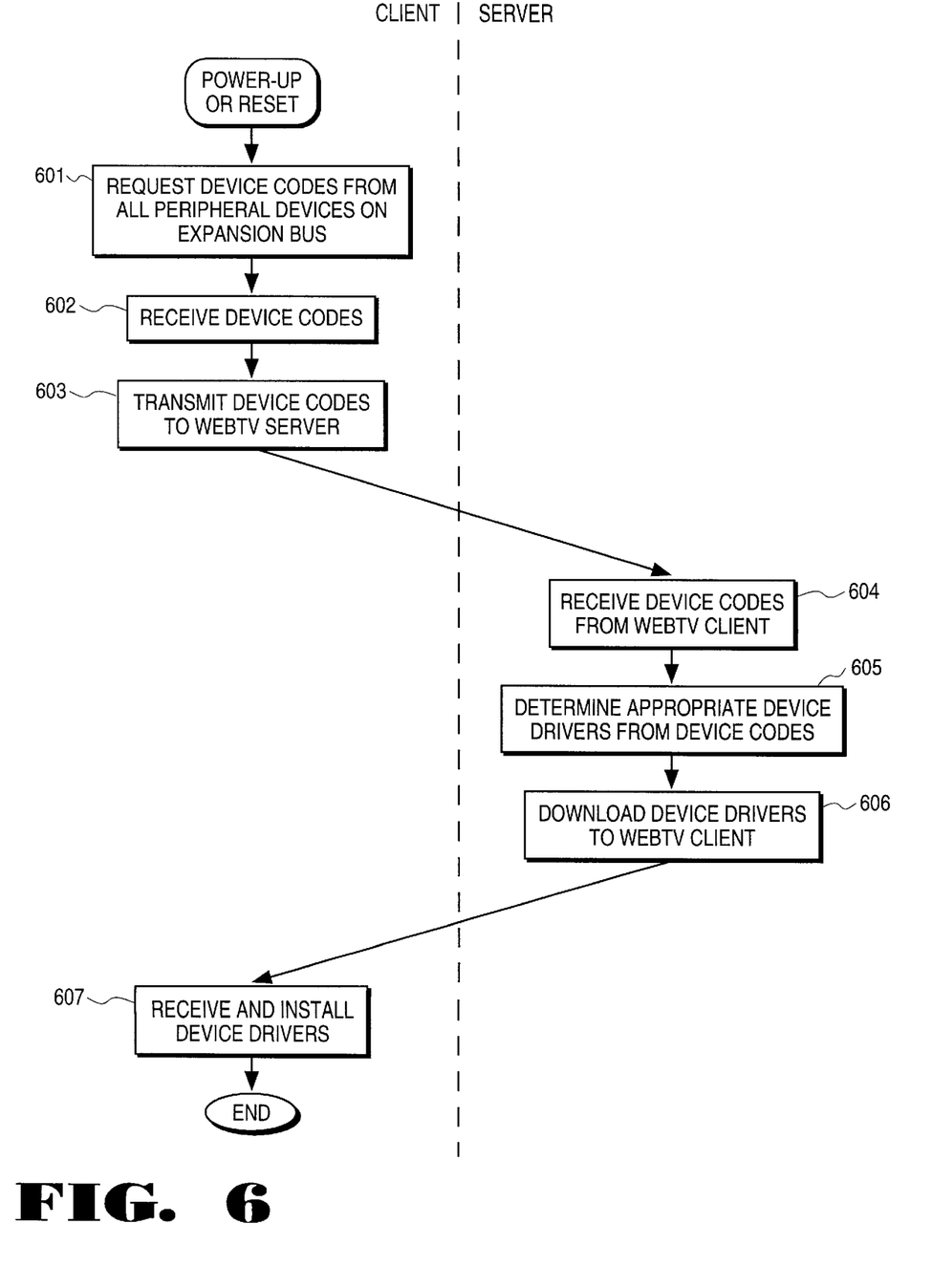
FIG. 6 is a flow diagram illustrating a routine for automatically downloading from a remote server the appropriate drivers for connected peripheral devices.

FIG. 6 illustrates a routine for installing the appropriate device drivers in client system 1a. In response to system initialization, the WebTV box 10 requests the device codes from all peripheral devices 30 connected in the daisy chain in step 601. Each peripheral device 30 that is designed to be used in a WebTV client system is designed to respond to such a request by transmitting its device code and slot number onto the bus 28 to the next most senior device in the daisy chain. Each peripheral device relays responses received from more junior devices in the daisy chain toward the WebTV box 10. Hence, in step 602, the WebTV box 10 receives the device codes from all connected peripheral devices 30. In step 603, the WebTV box 10 transmits all of the received device codes to the WebTV server 5 over the network connection 29.

Note that although FIG. 6 illustrates an embodiment in which all device codes are transmitted to the server 5 in one step and then all device drivers are downloaded in one step, such a sequence is not required to practice the present invention. For example, in an alternative embodiment, device codes and device drivers may be transmitted and downloaded (respectively) one at a time, i.e., on a piecemeal basis.

Stored in the WebTV server 5 are the device drivers for all peripheral devices that may be used in a WebTV client system and a database including the device codes of all such peripheral devices. The database is set up to allow device codes to be associated with the appropriate stored device drivers. Note that because the WebTV server system 5 provides much larger storage capacity than a WebTV client system does, it is practical to store the device drivers in the WebTV server system 5. Note also that, using this technique, the device drivers only need to be stored once, rather than storing them in every WebTV client system.

Hence, in step 604, the WebTV server 5 receives the device codes that were transmitted by the WebTV client 1 over the network. In step 605, in response to receiving the device codes, the WebTV server 5 automatically uses the received codes to reference the database to determine the appropriate device drivers for the particular peripheral devices 30 connected to the WebTV box 10. Once the appropriate drivers are identified, in step 606 the WebTV server 5 automatically downloads these device drivers to the WebTV client 1 over the network connection 29. In step 607, the WebTV box 10 receives and automatically installs the device drivers transmitted from the WebTV server 5.

Hence, the present invention provides a technique for installing in a main processing device (e.g., the WebTV box 10) only the appropriate drivers for the particular system configuration being used, in a manner that is automatic and transparent to the user. The technique provides the additional advantages of reducing consumption of memory in the main processing device with unused code while avoiding the requirement of providing additional memory in individual peripheral devices.

Thus, a method and apparatus have been described for automatically installing appropriate device drivers for all peripheral devices connected to a host processing system over a network. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a client system coupled to a peripheral device, a method of retrieving a device driver from a remote server and installing the device driver to the client system, the method comprising the steps of:

storing on the remote server device drivers for peripheral devices compatible with the client system and a device code associated with each compatible peripheral device and its device driver;

receiving, at the client system, the device code from the peripheral device;

transmitting the device code from the client system to the remote server, the device code being received at the client system and transmitted to the remote server without a user of the client system providing input that further identifies the peripheral device; and receiving, at the client system, the device driver from the remote server, the device driver having been selected to be appropriate for the peripheral device in response to the device code transmitted to the remote server, wherein the steps of receiving the device code, transmitting the device code and receiving the device driver are performed automatically upon powering-up the client system without further input from the user of the client system.

2. A method according to claim 1, wherein the device code identifies to the server a device type of the peripheral device.

3. A method according to claim 1, wherein the step of transmitting the device code to the remote server comprises the step of transmitting the device code to the remote server over a network.

4. A method according to claim 1, wherein the client system is coupled to a plurality of peripheral devices that are connected to the client system and one to another in a daisy chain configuration, and wherein the step of receiving the device code from the peripheral device comprises the steps of:

receiving, at the client system, a first device code associated with a most senior peripheral device in the daisy chain, the first device code being received directly from the most senior peripheral device; and receiving, at the client system, a second device code associated with a more junior peripheral device in the daisy chain, the second device code being received after passing from the more junior peripheral device through the most senior peripheral device.

5. A method according to claim 3, wherein the network comprises the Internet.

6. A method according to claim 1, wherein the peripheral device does not store a copy of the device driver.

7. A method according to claim 6, further comprising the step of storing the device driver at the client system, such that the client system does not store any device driver other than the device driver received from the remote server and any other device driver received from the remote server.

8. A method according to claim 7, wherein the step of storing the device driver at the client system is conducted without a user of the client system manually installing the device driver.

9. In a client system coupled to one or more peripheral devices, a method of retrieving a device driver from a remote server for each of the one or more peripheral devices and installing the device drivers to the client system, the method comprising the steps of:

storing on the remote server device drivers for all peripheral devices compatible with the client system and a device code associated with each compatible peripheral device and its device driver;

in response to an initialization of the client system, requesting, by the client system, the device code associated with each of the one or more peripheral devices, each device code being requested from the associated peripheral device;

receiving, at the client system, the device code associated with each of the one or more peripheral devices;

transmitting each received device code to the remote server via a network, each received device code being received at the client system and transmitted to the remote server without a user of the client system providing input that further identifies the associated peripheral device;

receiving, by the client system, one or more device drivers from the remote server, each of the one or more device drivers having been selected to be appropriate for one of the one or more peripheral devices in response to an associated device code having been transmitted to the server system; and storing the one or more device drivers at the client system, such that the client system does not store any device driver other than the one or more device drivers, wherein the steps of receiving the device code, transmitting the device code, receiving the device driver and storing the device driver are performed automatically upon powering-up the client system without further intervention by the user of the client system.

10. A method according to claim 9, wherein:

none of the one or more peripheral devices stores a copy of the appropriate device driver; and the step of storing the one or more device drivers at the client system is conducted without a user of the client system manually installing any of the one or more device drivers.

11. In a server system capable of communicating via a network with a remote client system, a method of selecting a device driver for a peripheral device coupled to the remote client system and transmitting the device driver to the remote client system, the method comprising the steps of:

storing on the remote server device drivers for all peripheral devices compatible with the client system and a device code associated with each compatible peripheral device and its device driver;

receiving, by the server system, the device code associated with the peripheral device from the remote client system, the device code being received by the server system without a user of the remote client system providing input that further identifies the peripheral device;

automatically selecting an appropriate device driver for the peripheral device based on the device code received by the server system; and transmitting the appropriate device driver from the server system to the remote client system, wherein the steps of receiving the device code, selecting the appropriate device driver and transmitting the appropriate device driver are performed automatically upon powering-up the remote client system without further input from or intervention by the user of the remote client system.

12. A method according to claim 11, wherein the device code received by the server system originates from, and is stored in, the peripheral device, wherein the device code indicates to the server system a device type of the peripheral device.

13. A method according to claim 11, wherein the step of receiving the device code comprises the step of receiving the device code over a network.

14. A method according to claim 11, wherein the step of automatically selecting an appropriate device driver comprises the steps of:

comparing, by the server system, the device code with data entries of a database that contains a compilation of device codes and a corresponding compilation of device drivers that support particular peripheral devices;

automatically identifying, from the data entries of the database, the appropriate device driver based on the device code received by the server system.

15. A method according to claim 13, wherein the network comprises the Internet.

16. A method according to claim 11, wherein the step of causing the appropriate device driver to be transmitted comprises the step of causing the appropriate device driver to be transmitted over a network.

17. A method according to claim 16, wherein the network comprises a wide area network.

18. A method according to claim 16, wherein the network comprises the Internet.

19. In a server system capable of communicating via a network with a remote client system, a method of selecting one or more device drivers for one or more peripheral devices coupled to the remote client system and transmitting the one or more device drivers to the remote client system, the method comprising the steps of:

storing on the remote server device drivers for all peripheral devices compatible with the client system and a device code associated with each compatible peripheral device and its device driver;

receiving, by the server system, one or more device codes associated with one or more peripheral devices, each received device code having been transmitted from the remote client system via a network without a user of the remote client system providing input that identifies the peripheral device;

selecting, based on the received one or more device codes, one or more device drivers, each being appropriate for one of the one or more peripheral devices;

retrieving each of the one or more device drivers from a storage device; and transmitting each of the one or more device drivers from the server system to the remote client system via the network, wherein the steps of receiving the one or more device codes, selecting the one or more device drivers, retrieving the one or more device drivers, and transmitting the one or more device drivers are performed automatically upon powering-up the remote client system without further input from or intervention by the user of the client system.

20. A method according to claim 19, wherein the step of automatically causing each of the one or more device drivers to be transmitted from the server system to the remote client system enables the remote client system to avoid storing any device driver other than the one or more device drivers.

21. A system comprising:

a remote server having stored thereon all peripheral devices compatible with the client processing system and a device code associated with each compatible peripheral device and its device driver; and a client processing system coupled to a peripheral device comprising a processor; and a computer-readable medium coupled to the processor, the computer-readable medium having computer-executable instructions stored therein which, when executed by the processor, cause the client processing system to perform the steps of:

requesting a device code from the peripheral device, the device code being associated with the peripheral device and indicating a device type of the peripheral device;

receiving the device code from the peripheral device;

transmitting the device code to the remote server, the device code being received by the client processing system and transmitted to the remote server without a user of the client processing system providing input that further identifies the peripheral device; and receiving a device driver from the remote server, the device driver having been selected to be appropriate for the peripheral device in response to the device code transmitted to the remote server, wherein the steps of requesting the device code, receiving the device code, transmitting the device code and receiving the device driver are performed automatically upon powering-up the client processing system without further input from or intervention by the user of the client processing system.

22. A client processing system according to claim 21, wherein the step of transmitting the device code to the remote server, comprises the step of transmitting the device code to the remote server over a network.

23. A client processing system according to claim 22, wherein the network comprises a wide area network.

24. A client processing system according to claim 22, wherein the network comprises the Internet.

25. A client processing system according to claim 22, wherein the step of receiving the device driver from the remote server, comprises the step of receiving the device driver from the remote server over the network.

26. A client processing system according to claim 25, wherein the network comprises a wide area network.

27. A client processing system according to claim 25, wherein the network comprises the Internet.

28. A server processing system in communication with a remote client system, the remote client system being coupled to a peripheral device, the server processing system comprising:

means for storing device drivers for peripherals compatible with the remote client system;

means for receiving from the client system, via a network, a device code of the peripheral device without a user of the client system providing input that identifies the peripheral device;

means for selecting one of the plurality of selectable device drivers as an appropriate device driver for the peripheral device based on the device code; and means for transmitting the appropriate device driver to the remote client system via the network, wherein the receiving means, the selecting means, and the transmitting means perform their respective functions automatically upon powering-up the client system without further input from or intervention by the user of the client system.

29. A server processing system according to claim 28, wherein the device code indicates a device type of the peripheral device.

30. A server processing system according to claim 29, wherein the device code is received from the remote client system after the remote client system receives the device code from the peripheral device.

31. A server processing system according to claim 28, wherein the network comprises a wide area network.

32. A server processing system according to claim 28, wherein the network comprises the Internet.

* * * * *